US012621663B2

(12) United States Patent (10) Patent No.: US 12,621,663 B2
Neumann et al. (45) Date of Patent: May 5, 2026

(54) MICROCONTROLLER HAVING WIRELESS COMMUNICATION MODULE FOR USE WITH A SYSTEM

(71) Applicant: DENTSPLY SIRONA Inc., York, PA (US)

(72) Inventors: Bastian Neumann, Lorsch (DE); Christian Pfluger, Fuerth (DE); Helge Brauer, Bensheim (DE)

(73) Assignee: Dentsply Sirona Inc., York, PA (US)

( * ) Notice: Subject to any disclaimer, the term of this patent is extended or adjusted under 35 U.S.C. 154(b) by 74 days.

(21) Appl. No.: 18/652,944

(22) Filed: May 2, 2024

(65) Prior Publication Data

US 2025/0344059 A1 Nov. 6, 2025

(51) Int. Cl.
H04W 12/041 (2021.01)
H04W 12/0431 (2021.01)

(52) U.S. Cl.
CPC ..... H04W 12/0431 (2021.01); H04W 12/041 (2021.01)

(58) Field of Classification Search
CPC ......................... H04W 12/0431; H04W 12/041
See application file for complete search history.

(56) References Cited

U.S. PATENT DOCUMENTS

2002/0116632 A1* 8/2002 Itoh .......................... G06F 21/10
726/34

2015/0365231 A1* 12/2015 Warnez ............... H04W 12/041
380/44
2017/0171165 A1 6/2017 Britt et al.
2018/0019980 A1* 1/2018 Dempster ............... G06F 21/84
(Continued)

FOREIGN PATENT DOCUMENTS

CN 206023769 3/2017
CN 206023769 U * 3/2017

OTHER PUBLICATIONS

"European Application Serial No. 25174047.8, Extended European Search Report mailed Jun. 6, 2025", 10 pgs.
(Continued)

*Primary Examiner* — Andrew Suh
(74) *Attorney, Agent, or Firm* — SCHWEGMAN LUNDBERG & WOESSNER, P.A.

(57) ABSTRACT

Systems, apparatuses, and methods that provide for a wireless communication microcontroller for use with a system microcontroller. A first microcontroller is configured to control aspects of a system in which the device can be embedded. A second microcontroller is operatively connected to the first microcontroller, with the second microcontroller including a wireless communication module for wireless communication. A secure element is operatively connected to the second microcontroller, with a cryptographic key being stored in the secure element. The second microcontroller is configured to receive instructions for programming the first microcontroller through the wireless communication module and request a session key from the secure element. The secure element is configured to generate the session key using the cryptographic key. The second microcontroller is further configured validate the instructions using the session key and send the validated instructions to the first microcontroller.

9 Claims, 3 Drawing Sheets

(56) References Cited

U.S. PATENT DOCUMENTS

| 2019/0335333 A1* | 10/2019 | Sohail | H04W 12/06 |
| 2019/0394172 A1* | 12/2019 | Hersent | H04L 9/0861 |
| 2023/0116566 A1* | 4/2023 | Kim | H04W 12/03 |
| | | | 726/17 |
| 2024/0020047 A1* | 1/2024 | Bert | G06F 3/0604 |
| 2024/0305447 A1* | 9/2024 | Keidar | H04L 9/14 |

OTHER PUBLICATIONS

Chao, Gao, "Microcontroller Based IoT System Firmware Security: Case Studies", 2019 IEEE International Conference on Industrial Internet (ICII), (Nov. 11, 2019), 10 pgs.

* cited by examiner

300

System
Microcontroller
Receives Data
from System
302

Data sent to
Wireless
Microcontroller
304

Secure Element
Generates
Session Key
306

Data is Secured
308

Secured Data sent
by Wireless
Connection
310

MICROCONTROLLER HAVING WIRELESS COMMUNICATION MODULE FOR USE WITH A SYSTEM

BACKGROUND

Field of the Invention

Embodiments of the invention relate to systems, apparatuses, and methods that provide a wireless communication microcontroller for use with a system microcontroller.

Related Art

Microcontrollers play a pivotal role in the functionality of numerous electronic devices, providing a compact and efficient means of control and computation. When embedded in a system, a microcontroller serves as the central processing unit, executing predefined instructions to manage various operations of the system. The versatility of microcontrollers is evident across a spectrum of systems, ranging from everyday appliances to complex industrial systems. In household items like washing machines, microwave ovens, and smart thermostats, microcontrollers regulate processes, monitor sensors, and facilitate user interfaces. In automotive applications, microcontrollers control engine functions, manage safety systems, and enable features like anti-lock braking. Industrial machinery, medical devices, and consumer electronics all benefit from the integration of microcontrollers, enhancing precision, automation, and adaptability. Their ability to handle specific tasks efficiently, coupled with their cost-effectiveness, makes microcontrollers indispensable in shaping the functionality of modern electronic devices.

Microcontrollers are programmable, allowing developers to write code for instructions for the microcontrollers to perform specific functions within the systems that the microcontrollers are embedded. As such, the programming of microcontrollers sometimes needs to be updated. For example, there is sometimes a need to update a microcontroller's code to fix bugs, improve performance, or provide further compatibilities.

If a microcontroller is operatively connected to a network, then the microcontroller may be able to receive programming updates through the network connection. But many systems in which microcontrollers are embedded do not have a network connection. Moreover, even if a system with a microcontroller has a network connection, it is important that the connection be secure so that updates to the microcontroller's programming are validated. Handling a secure connection and validating data are complex and computationally intensive processes. And many microcontrollers in small devices are not capable of such functionalities. Thus, update programming must be done with direct connection to the devices/systems, for example, by using an external memory interface such as a thumb drive or using a data cable.

SUMMARY OF THE INVENTION

According to one embodiment, a device includes a first microcontroller configured to control aspects of a system in which the device can be embedded; a second microcontroller operatively connected to the first microcontroller, the second microcontroller including a wireless communication module for wireless communication; and a secure element operatively connected to the second microcontroller, with at least one cryptographic key being stored in the secure element. The second microcontroller is configured to receive instructions for programming the first microcontroller through the wireless communication module and request a session key from the secure element, the secure element is configured to generate the session key using the cryptographic key and send the session key to the second microcontroller, and the second microcontroller is configured to validate the instructions using the session key and send the validated instructions to the first microcontroller.

According to another embodiment, a device includes a first microcontroller configured to control aspects of a system in which the device can be embedded; a second microcontroller operatively connected to the first microcontroller, the second microcontroller including a wireless communication module for wireless communication; and a secure element operatively connected to the second microcontroller, with at least one cryptographic key being stored in the secure element. The second microcontroller is configured to receive data through the wireless connection module and request a first session key from the secure element, the secure element is configured generate the session key using the at least one cryptographic key, and the second microcontroller is configured to validate the data received through the wireless connection module and send the validated data to the first microcontroller. The second microcontroller is also configured to receive data from the system in which the device can be embedded and request a second session key from the secure element, the secure element is configured to generate the second session key using the at least one cryptographic key, and the second microcontroller is configured to secure the data using the second session key and transmit the secured data using the wireless communication module.

According to another embodiment, a method is provided for receiving and applying instructions for programming a microcontroller. The method includes receiving instructions relating to the programming of a first microcontroller via a wireless network connection managed by a second microcontroller; validating the instructions using a session key generated using a cryptographic key stored in a secure element that is operatively connected to the second microcontroller; transmitting the validated instructions from the second microcontroller to the first microcontroller; and applying the instructions to program the first microcontroller.

According to a further embodiment, a method is provided for transmitting data from a microcontroller. The method includes receiving data from a system at a first microcontroller that is configured to control aspects of the system; transmitting the data to a second microcontroller operatively connected to the first microcontroller; securing the data using a session key generated from a cryptographic key stored in a secure element that is operatively connected to the second microcontroller; transmitting the secured data using a wireless connection module of the second microcontroller.

DETAILED DESCRIPTION OF THE INVENTION

Embodiments of the invention will now be described. The embodiments include systems, apparatuses, and methods that provide for a wireless communication microcontroller for use with a system microcontroller. Specific embodiments relate to using a microcontroller with a wireless connection module to receive programming instructions for a system microcontroller and validating the instructions using a secure element. Further specific embodiments relate to using the microcontroller with the wireless connection module to transmit secured data received from a system microcontroller.

A microcontroller is a compact integrated circuit that functions as a self-contained computing system designed for embedded applications. A microcontroller comprises a central processing unit (CPU), memory, input/output ports, and often additional peripherals like timers, counters, and communication interfaces. Often, microcontrollers are tailored for specific tasks within electronic devices. When embedded in such devices, the CPU of the microcontroller interprets and executes stored instructions from memory, while the I/O ports enable interaction with components of the devices.

In the descriptions herein, embodiments of the invention will be referred to as a "device," such as a printed circuit board (PCB), that includes a system microcontroller, a wireless communication microcontroller, and a secure element. Further, descriptions will be made of the device may be embedded within a "system," with the system microcontroller controlling aspects of the system. It will be appreciated that the system may itself be viewed as a "device." For example, a device according to embodiments of the invention may be embedded in a medical device, with the medical device being the system in such a case.

Figure 1:
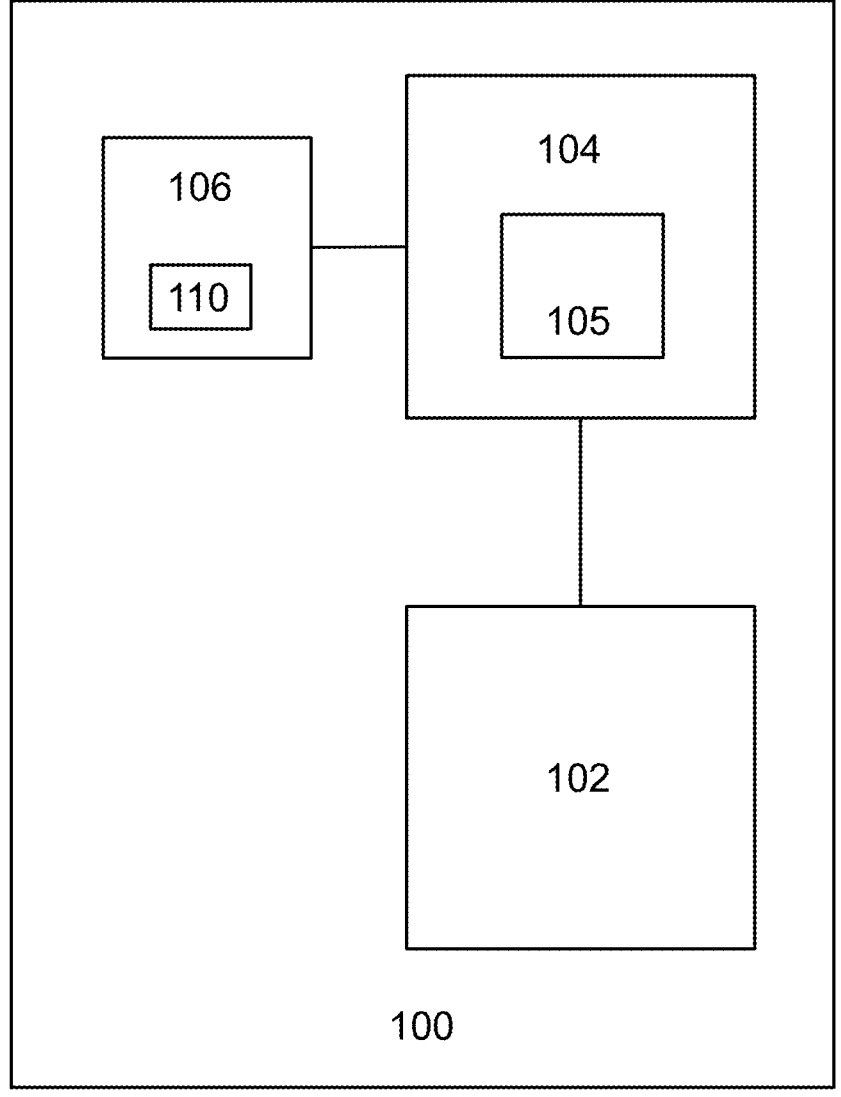
FIG. 1 is a conceptual diagram of an apparatus according to embodiments of the invention.

FIG. 1 depicts an embodiment of the invention. This embodiment is directed to a device in the form of circuit board (e.g., a PCB) 100. A system (first) microcontroller 102, a wireless communication (second) microcontroller 104, and a secure element 106, are mounted on the circuit board 101, e.g., by soldering or with wires. Note that the circuit board 100 will include other components, such as resistors, capacitors, inductors, etc., which are not depicted in FIG. 1.

The system microcontroller 102 controls functions of a system in which the circuit board 100 is embedded by executing a pre-programmed set of instructions stored in its memory. These instructions dictate how the microcontroller interacts with input signals from sensors or user interfaces. Through its GPIO (General Purpose Input/Output) pins, the microcontroller communicates with external components to carry out specific tasks. By processing data, making decisions based on programmed logic, and coordinating timing, the microcontroller orchestrates operations of the system in which it is embedded in accordance with its intended functionality.

The system microcontroller 102 and the wireless communication microcontroller 104 are operatively connected through traces on the circuit board 100, which are conductive pathways on the circuit board 100 that link the output/input pins of one of the microcontrollers to the output/input pins of the other microcontroller, thereby allowing for communication between the microcontrollers through an interface. Those skilled in the art will recognize the various types of interfaces that may be used between microcontrollers as described herein. Examples of such interfaces are universal asynchronous receiver/transmitter (UART), serial wire debug (SWD), serial peripheral interface (SPI), and Joint Test Action Group (JTAG) interface.

The wireless communication microcontroller 104 provides for a network connection by including a wireless communication module 105. The wireless communication module 105 allows for reception and transmission of data using one or more wireless protocols. Examples of such protocols are WI-FI®, BLUETOOTH®, ZIGBEE®, Z-WAVE®, LORAWAN®, radio frequency identification (RFID), near field communication (NFC), or cellular communication. In effect the wireless communication microcontroller 104 can establish a wireless connection (e.g., WI-FI®) to a network or directly to another system/device (e.g., using BLUETOOTH®).

The wireless communication microcontroller 104 is operatively connected (e.g., through a trace on the circuit board 100) to the secure element 106. In embodiments of the invention, the secure element 106 is a trusted platform module (TPM) that includes a memory in which one or more cryptographic keys 110 are stored. Each cryptographic key 110 is a unique, confidential sequence of characters or bits that can be used for validating and securing data as described herein. The secure element 106 is configured to provide for data validation/security processes by session key generation. As will be appreciated by those skilled in the art, a session key is a single use cryptographic key that can be used to encrypt/decrypt a communication session, as in the receipt or transmission of data. The secure element 106 uses the one or more cryptographic keys 110 stored in its memory to generate session keys that are used by the wireless communication microcontroller 104 to validate (decrypt and/or authenticate) data received by the wireless communication microcontroller 104. The secure element 106 also uses the one or more cryptographic keys 110 to generate session keys that are used by the wireless communication microcontroller 104 to secure (e.g., encrypt) data to be transmitted by the wireless communication microcontroller 104. This ensures security and integrity of the data that is received and transmitted by the wireless communication microcontroller 104.

Figure 2:
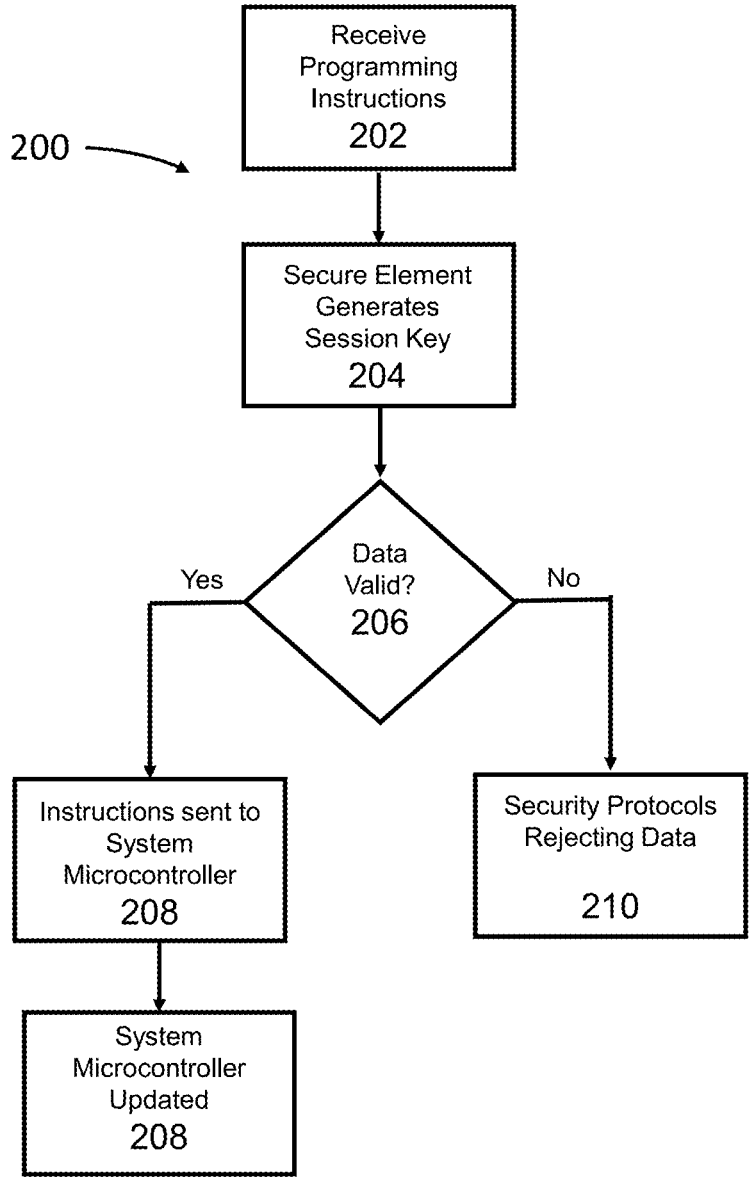
FIG. 2 is a flow chart showing steps of methods according to embodiments of the invention.

FIG. 2 is a flow chart showing steps of a method 200 of providing instructions related to programming a system microcontroller in a device as shown in FIG. 1. In this embodiment, the system microcontroller receives an update for the program(s) controlling the system microcontroller's functionality. As will be appreciated by those skilled in the art, updating a microcontroller can variously described, for example, as "updating," "programming," or providing new version of "firmware." All such terminology is encompassed by the provision of programming instructions for the system microcontroller as described herein. The method 200 is exemplified in the descriptions as providing an update for programming that has previously been received by the system microcontroller. But, in other embodiments, the programming instructions could be the initial communication of programming instructions to the system microcontroller for a first time. It should also be noted that although the method 200 is described for a case where a single package of programming instructions is received by a wireless microcontroller and applied to a system microcontroller, other methods according to embodiments of the invention include the wireless microcontroller receiving multiple packages of programming instructions are received by the wireless microcontroller and applied to the system microcontroller.

At step 202 the wireless communication microcontroller receives the data transmission containing the programming instructions for the system microcontroller. The data in the transmission is secured (e.g., encrypted) and therefore must be validated (e.g., decrypted and/or authenticated) by the system before the programming instructions can be applied to the system microcontroller. The data transmission is received using the wireless connection module of the wireless communication microcontroller. The data transmission may therefore be sent to the system in which the wireless communication microcontroller is embedded through a network such as the Internet and/or local area network. As another example, the data transmission may be sent directly from another device having a BLUETOOTH® connection when that device is proximate to the wireless communication microcontroller. Those skilled in the art will recognize numerous types of wireless data transfer configurations that could be used with a microcontroller having a wireless communication module as described herein.

At step 204, the wireless communication microcontroller requests a session key from the secure element to validate the data received in the data transmission. The secure element utilizes a cryptographic key stored within its memory to generate the session key, and then sends the session key to the wireless communication microcontroller. Using the session key, the wireless communication microcontroller validates the received data at step 206 by decrypting and/or authenticating the incoming data, ensuring it matches the expected parameters and that the incoming data has not been tampered with during transmission. Note that validating the instructions in the processes according to embodiments described herein does not necessarily mean validating all aspects of the programming instructions. Rather, validating the instructions refers to, for example, only validating a checksum of the programming instructions.

If the data is determined to be valid, the wireless communication microcontroller proceeds to send the validated programming instructions to the system microcontroller at step 206. Thereafter, at step 208, the programming of the system microcontroller is updated per the received instructions.

However, if the data transmission fails the verification, countermeasures are performed by the wireless communication microcontroller in step 210. Such security countermeasures reject the data, and may include error handling, isolation, secure restarts, security audits, recovery updates. Those skilled in the art will recognize other procedures that may be performed when the received data is rejected, such as the initiation of a retransmission of the data from a trusted source.

As will be appreciated by those skilled in the art, the method 200 could be adapted for sending data to a system microcontroller other than programming instructions. For example, the data could be instrument databases or workflows.

Figure 3:
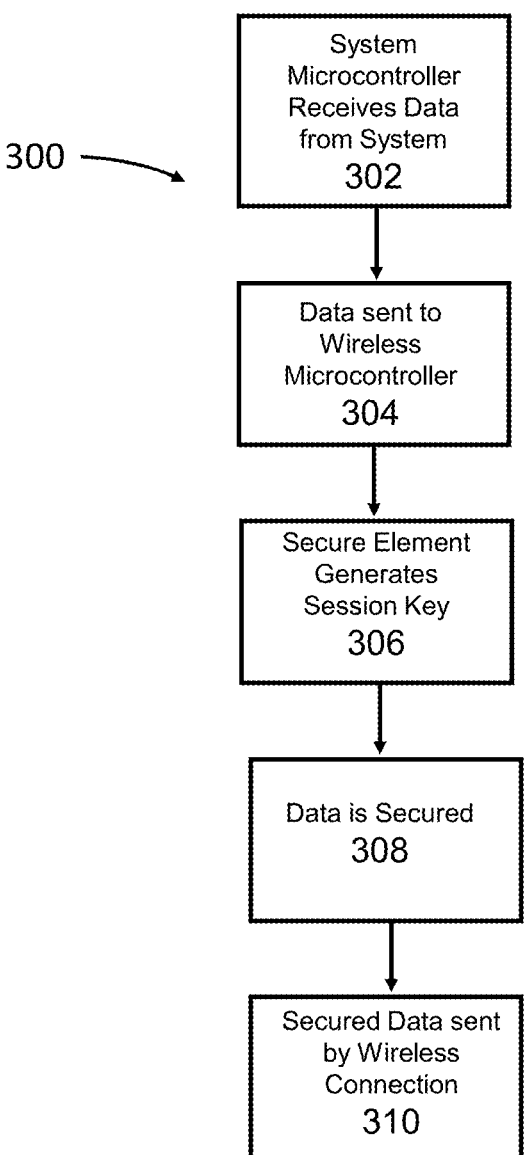
FIG. 3 is a flow chart showing steps of methods according to further embodiments of the invention.

FIG. 3 is a flow chart showing steps of a method 300 for transmitting data according to embodiments of the invention. The method 300 may be performed in a system with a device as described above. In this embodiment, the system microcontroller receives data for transmission from the system in which the is embedded. Such data may be, for example, log data, error codes, status data, or telemetry data. Such types of data are often unsecure, meaning that the data is not protected or encrypted, making it vulnerable to unauthorized access, manipulation, or theft.

At step 302, the data to be transmitted is received by a system microcontroller. And at step 304 the data is sent from the system microcontroller to a wireless communication microcontroller operatively linked to the system microcontroller, e.g., the microcontrollers are mounted on the same circuit board.

At steps 306 and 308, the data is secured. This is done by the wireless communication microcontroller requesting a session key from a secure element and the secure element generating the session key using a cryptographic key stored in its memory at step 306. Utilizing the session key received from the secure element, the wireless communication microcontroller employs encryption algorithms and cryptographic operations to secure the data at step 308. Once the data is appropriately encrypted and protected, at step 310 the wireless communication microcontroller transmits the secured data using its wireless communication module. The secured data may be transmitted, for example, to a network or directly to another device.

Still further embodiments of the invention are directed to systems, apparatuses, and methods that provide a wireless communication microcontroller and secure element for both data reception and data transmission. In other words, embodiments of the invention encompass the combination of the methods described in FIGS. 2 and 3, with the secure element generating a first session key when the wireless communication microcontroller receives data through the wireless communication module, and with the secure element generating a second session key when the wireless communication microcontroller receives data for transmission using the wireless communication module. Thus, a system having a system microcontroller can be provided with the ability to both securely receive and securely transmit data.

It will be appreciated that embodiments of the invention may be used in conjunction with numerous types of devices. System microcontrollers are found in countless types of systems/devices, such as medical devices, household appliances, consumer electronics, home automation devices, automotive systems, industrial control systems, and monitoring systems. The embodiments of the invention effectively provide a module, e.g., a circuit board, that may easily be embedded in such systems/devices, with the module thereby providing for security in data receiving and data transmission. Indeed, embodiments of the invention are easily applied to many existing modules, such as circuit boards, that include a system microcontroller. For example, a wireless communication microcontroller and secure element as described herein may be easily integrated into an existing circuit board. By providing the wireless communication microcontroller and secure element, secure data may easily be sent and received by a system microcontroller that previously had no wireless connection.

A distributed sensor network is a specific example of an application that embodiments of the invention described herein can be used with. This type of network includes multiple sensor nodes deployed across an area, each equipped with sensors capable of detecting specific events or phenomena. These sensor nodes continuously monitor their surroundings, listening for predefined events or changes in environmental conditions. Upon detection of an event, such as motion, temperature variation, or sound, the sensor node triggers a signal that is transmitted to a system microcontroller. The system microcontroller receives these signals from various sensor nodes and can be configured to initiate appropriate actions or responses based on programmed logic.

The combination of a wireless communication microcontroller and secure element can be integrated with such a distributed sensor network. For example, the wireless communication microcontroller and secure element can be mounted on the circuit board to which the system microcontroller for the network is mounted. Thus, per the methods described herein, secured data from the network can be transmitted to another network or device.

A wireless communication microcontroller and secure element according to embodiments of the invention could further be configured to operate in conjunction with operations of the associated system/device. For example, in the example of a distributed sensor network, the wireless communication microcontroller could be programmed to be powered down during a period of time, and then powered up at certain times to determine if there have been any data received from the sensors that needs to be transmitted using the wireless communication module and secure element. Alternatively, the wireless communication microcontroller could be programmed to be powered up any time that data is received by the system microcontroller for transmission by the wireless communication module and secure element, e.g., whenever there is an event detected by the sensors.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of embodiments of the invention and its practical applications, to thereby enable others skilled in the art to best utilize embodiments of the invention and various implementations with various modifications as are suited to the particular use contemplated.

The invention claimed is:

1. A device comprising:
a first microcontroller configured to control aspects of a system in which the device can be embedded;
a second microcontroller operatively connected to the first microcontroller, the second microcontroller including a wireless communication module providing for wireless communication; and
a secure element operatively connected to the second microcontroller, with at least one cryptographic key being stored in the secure element,
wherein the second microcontroller is configured to receive instructions for programming the first microcontroller through the wireless communication module and request a session key from the secure element, the secure element is configured to generate the session key using the at least one cryptographic key and send the session key to the second microcontroller, and the second microcontroller is configured to validate the instructions using the session key and send the validated instructions to the first microcontroller.

2. The device according to claim 1, wherein the second microcontroller is configured to receive data from the system in which the device is embedded; secure the data using a session key received from the secure element; secure the data received from the system; and transmit the secured data using the wireless communication module.

3. The device according to claim 1, wherein the wireless communication module provides for at least one of communication by WI-FI®, BLUETOOTH®, ZIGBEE®, Z-WAVE®, LORAWAN®, radio-frequency identification (RFID), near field communication (NFC), and cellular communication protocol.

4. The device according to claim 1, wherein the first microcontroller and the second microcontroller are connected by universal asynchronous receiver/transmitter (UART), serial wire debug (SWD), serial peripheral interface (SPI), or Joint Test Action Group (JTAG) interface.

5. The device according to claim 1, wherein the device is a circuit board to which the first microcontroller, the second microcontroller, and the secure element are affixed.

6. A device comprising:
a first microcontroller configured to control aspects of a system in which the device can be embedded;
a second microcontroller operatively connected to the first microcontroller, the second microcontroller including a wireless communication module providing for wireless communication; and
a secure element operatively connected to the second microcontroller, with at least one cryptographic key being stored in the secure element,
wherein the second microcontroller is configured to receive data through the wireless communication module and request a session key from the secure element, the secure element is configured to generate a first session key using the at least one cryptographic key and send the first session key to the second microcontroller, and the second microcontroller is configured to validate the data received through the wireless communication module and send the validated data to the first microcontroller, and
wherein the second microcontroller is configured to receive data from the system in which the device can be embedded and request a second session key from the secure element, the secure element is configured to generate the second session key using the at least one cryptographic key and send the second session key to the second microcontroller, and the second microcontroller is configured to secure the data using the second session key and transmit the secured data using the wireless communication module.

7. The device according to claim 6, wherein the wireless communication module provides for at least one of communication by WI-FI®, BLUETOOTH®, ZIGBEE®, Z-WAVE®, LORAWAN®, radio-frequency identification (RFID), near field communication (NFC), and cellular communication protocol.

8. The device according to claim 6, wherein the first microcontroller and the second microcontroller are connected by universal asynchronous receiver/transmitter (UART), serial wire debug (SWD), serial peripheral interface (SPI), or Joint Test Action Group (JTAG) interface.

9. The device according to claim 6, wherein the device is a circuit board to which the first microcontroller, the second microcontroller, and the secure element are affixed.

* * * * *